United States Patent [19]
Kempkers et al.

[11] Patent Number: 5,415,554
[45] Date of Patent: May 16, 1995

[54] TRIM PANEL CONNECTING LINK

[75] Inventors: Gordon B. Kempkers, Hamilton; Dale J. Frye; Robert P. Ryan, both of Holland, all of Mich.

[73] Assignee: Prince Corporation, Holland, Mich.

[21] Appl. No.: 144,642

[22] Filed: Oct. 28, 1993

[51] Int. Cl.⁶ .................................... H01R 33/945
[52] U.S. Cl. ............................. 439/34; 296/219
[58] Field of Search .......... 439/34; 307/9.1, 10.1; 296/39.1, 146.9, 219; 40/593

[56] References Cited

U.S. PATENT DOCUMENTS

| | | | |
|---|---|---|---|
| D. 328,587 | 8/1992 | Arbisi | D12/187 |
| 1,522,241 | 1/1925 | Hennessey . | |
| 3,300,867 | 1/1967 | Sampson | 33/222 |
| 4,103,430 | 8/1978 | Schrader | 33/348 |
| 4,241,870 | 12/1980 | Marcus | 296/37.7 |
| 4,309,828 | 1/1982 | Sakamoto | 33/355 |
| 4,505,054 | 3/1985 | Clark et al. | 33/357 |
| 4,546,551 | 10/1985 | Franks | 33/356 |
| 4,588,267 | 5/1986 | Pastore | 350/600 |
| 4,630,904 | 12/1986 | Pastore | 350/600 |
| 4,677,381 | 6/1987 | Geerlings | 324/253 |
| 4,796,091 | 1/1989 | Nohtomi | 358/256 |
| 4,902,068 | 2/1990 | Dowd et al. | 296/219 |
| 4,953,305 | 9/1990 | Van Lente et al. | 33/356 |
| 5,016,996 | 5/1991 | Ueno | 350/600 |
| 5,040,990 | 8/1991 | Suman et al. | 439/34 |
| 5,154,617 | 10/1992 | Suman et al. | 439/34 |
| 5,223,814 | 6/1993 | Suman | 340/525 |

FOREIGN PATENT DOCUMENTS 0284488  9/1988  European Pat. Off. ............. 439/39

*Primary Examiner*—Eugene F. Desmond
*Attorney, Agent, or Firm*—Price, Heneveld, Cooper, DeWitt & Litton

[57] ABSTRACT

A trim panel connecting link for one of the vehicle pillars, such as an A-pillar includes electrical conductors with a plug or socket at each opposite end thereof which connect with a mating socket or plug in the headliner and instrument panel for interconnecting the vehicle electrical system with the headliner electrical components. In a preferred embodiment an A-pillar display is mounted to the trim panel. In another embodiment the display is coupled to the conductors of the connecting link.

25 Claims, 3 Drawing Sheets

TRIM PANEL CONNECTING LINK

BACKGROUND OF THE INVENTION

The present invention pertains to vehicle electrical components and particularly a trim panel which includes an electrical connecting link.

In many modern vehicles, a significant number of electrical components are mounted in the vehicle headliner, either in a console mounted to the headliner or in other housings which are positioned to be readily accessible by the vehicle operator and/or passengers. Such components may include, for example, trip computers, vehicle engine operating parameter displays and warning lights, electrical compasses, garage door opening transmitters, cellular telephones, map reading lamps, and tile like. In tile past, electrical conductors, which extend from the instrument panel, supply data along a multiplex conductor and power along a variety of power conductors to and from these components. The bundle of conductors have been trained typically along or within the A- and C-pillars of a vehicle, although sometimes along the B-pillar as well. These pillars are tile structural members extending from the vehicle body to the roof for supporting tile roof and window frames and are covered to conform to the vehicle interior decor. The conductors are typically in a bundle and extend continuously from behind the instrument panel up one of the structural pillars of the vehicle and include a plug at an end remote from the instrument panel which is connected to a suitable socket for the headliner electronics as tile car is assembled and the headliner positioned in place.

When supplying electricity to the vehicle headliner, it is thus necessary during assembly of the vehicle to align and run a conductor from the instrument panel area to the A-pillar and into an area for connection to the headliner connector. This can be problematic inasmuch as tile conductor must also be connected to the instrument panel, typically by a plug, which can be somewhat inaccessible. Also, the elongated conductor bundle can be damaged during handling and installation of the instrument panel to which tile conductors may also be pre-wired. Thus, tile prior art use of continuous elongated conductors from the instrument panel to the headliner area through whatever pathway is somewhat unsatisfactory.

SUMMARY OF THE PRESENT INVENTION

The system of the present invention provides for a connecting link which is in tile form of a trim panel for one of the vehicle pillars, such as an A-pillar and which includes mounted therein electrical conductors with a plug or socket at each opposite ends thereof which connect with a mating socket or plug in the headliner and on a shortened conductor which extends from tile instrument panel for interconnecting the vehicle electrical system with the headliner electrical components.

The A-pillars of modern vehicles have become increasingly slanted rearwardly and provide an excellent location for the mounting of a display for vehicle information which is readily visible to the driver. By integrating the A-pillar display information with the connecting link used in supplying power and data from the instrument panel to the headliner electrical components, the A-pillar trim panel can be pre-manufactured with a variety of vehicle electronics, including, for example, an electrical compass, switch means for controlling the compass, and a display which can be coupled to the conductors of the connecting link extending from the instrument panel to the headliner. This permits the trim panel to incorporate a variety of electronics and also provide an improved system for coupling the vehicle headliner electrical components to the vehicle's electrical system.

These and other features, objects, and advantages of the present invention will best be understood by reference to tile following description thereof together with the accompanying drawings in which:

DETAILED DESCRIPTION OF THE PREFERRED EMBODIMENT

Figure 1:
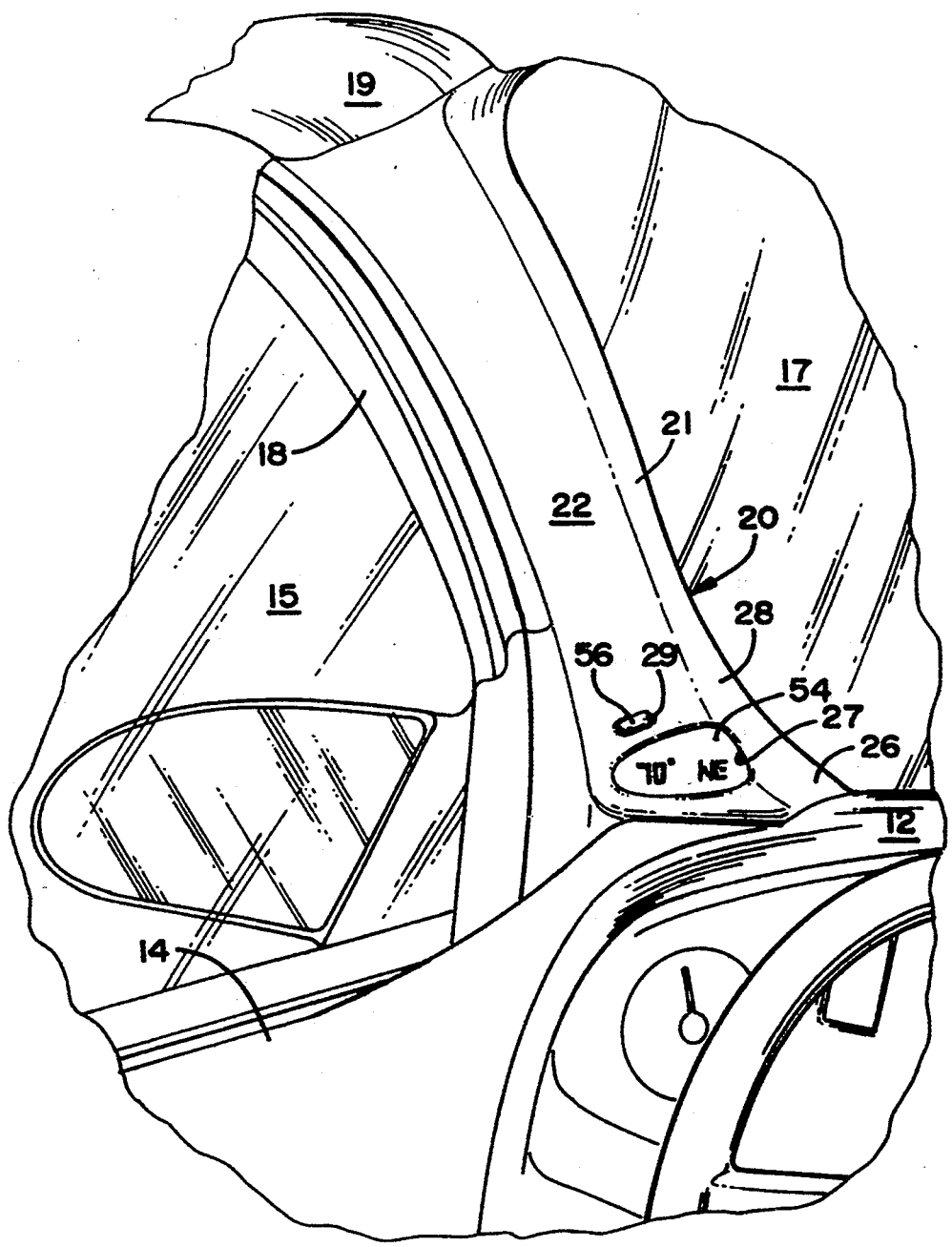
FIG. 1 is a fragmentary perspective view of the front left corner of a vehicle showing a portion of an A-pillar panel.
Figure 2:
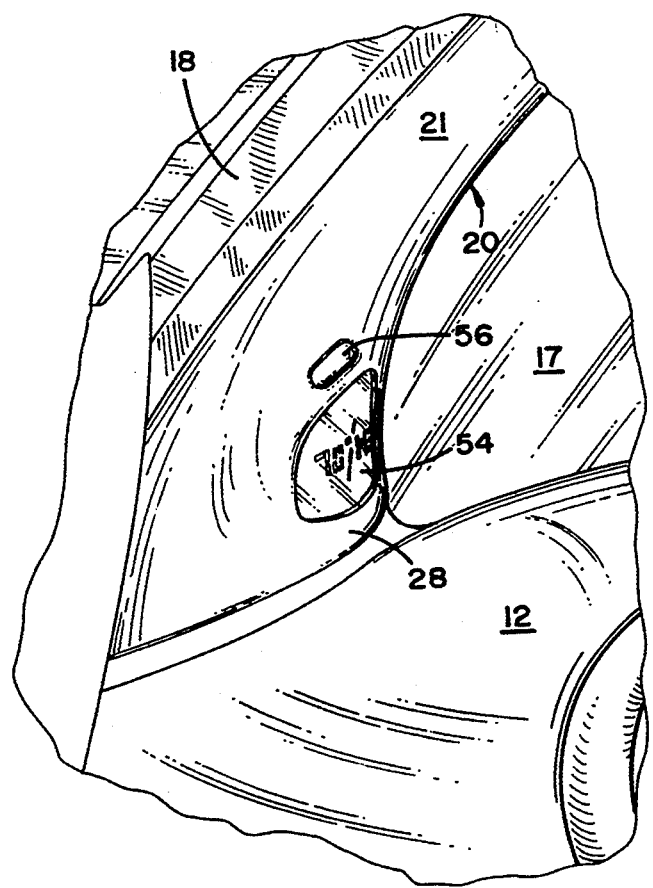
FIG. 2 is a fragmentary left side perspective view of the structure shown in FIG. 1.

Referring initially to FIGS. 1-2, there is shown a vehicle 10, such as an automobile having an instrument panel 12, a driver side door 14, a side window 15, and a windshield 17. An A-pillar 18 (FIG. 2) extends upward and rearwardly from the body of the vehicle from the left corner of the windshield 17 to the sheet metal roof of the vehicle which is covered by a headliner 19. Mounted to the vehicle headliner may be a variety of vehicle electronics, including garage door opening transmitters and map lamps such as disclosed in U.S. Pat. No. 4,241,870, the disclosure which is incorporated herein by reference or other selected vehicle options as disclosed in U.S. Pat. No. 5,154,617, the disclosure also of which is incorporated herein by reference. Covering the A-pillar 18 of the vehicle 10 illustrated in FIGS. 1-2 is a trim panel connecting link 20 of the present invention which is now described in greater detail with reference to FIGS. 1-4.

Figure 3:
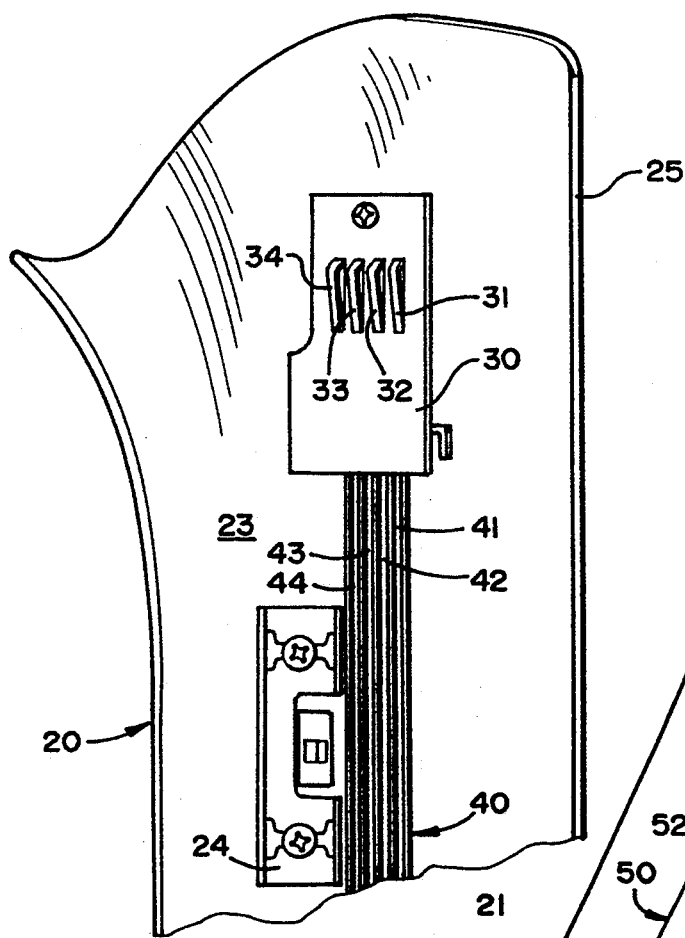
FIG. 3 is a rear elevational view of the top of the A-pillar trim panel shown in FIGS. 1-2.
Figure 4:
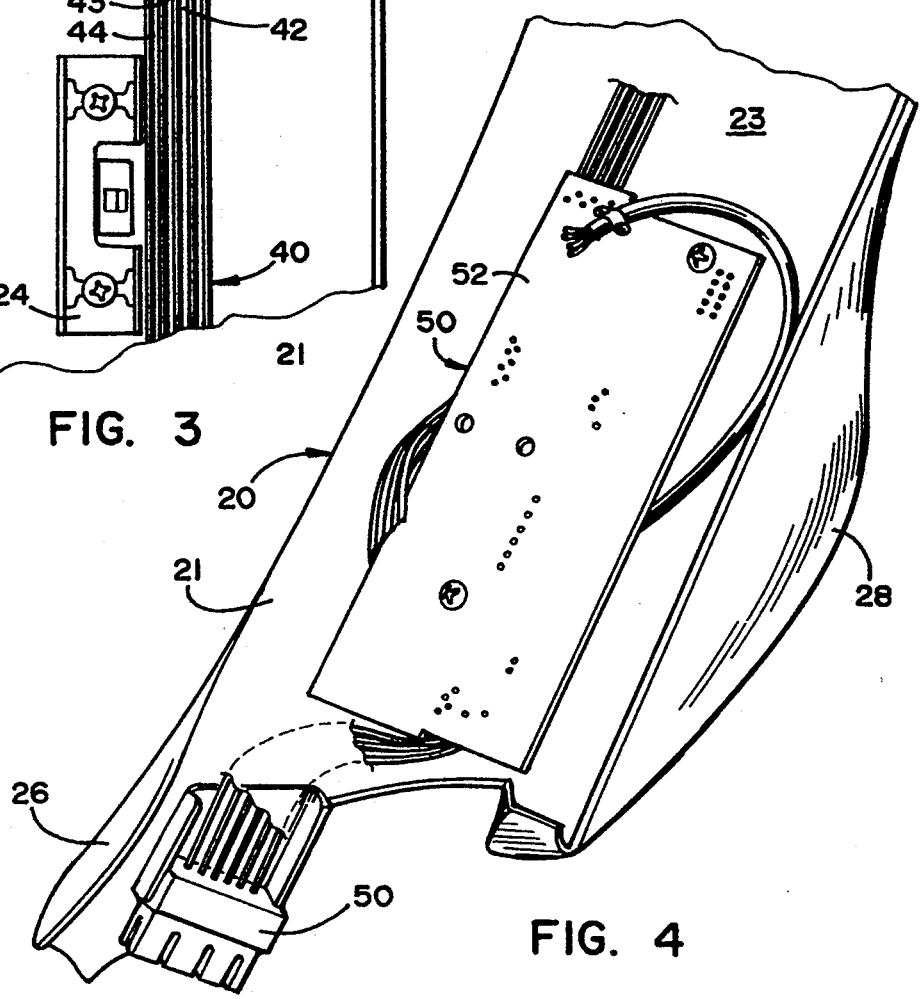
FIG. 4 is a rear elevational view of the bottom of the A-pillar trim panel shown in FIGS. 1-2.

The trim panel connecting link 20 shown in these figures comprises a molded polymeric panel 21 having a generally convex outer surface 22 which may be pebble-grained or otherwise textured and colored to aesthetically conform to the vehicle interior. The opposite or inner surface 23 shown in FIGS. 3-4 is generally concave and includes at least one conventional spring fastening clip 24 (FIG. 3) secured thereto for snap-fitting into an aperture in the A-pillar 18 for attachment of the trim panel to the A-pillar. As seen in FIGS. 1-4, both the tipper and lower ends 25 and 26 respectively of panel 21 have a curvilinear shape to conform to the interface between the windshield and headliner and instrument panel and windshield respectively, as well as the opening for side door 14. The trim panel may be molded of a suitable polymeric material such as polycarbonate, ABS or the like.

Mounted to the inner surface 23 of the connecting is a first electrical connector 30 mounted to the top end 25 of the panel 21. Connector 30 includes contacts 31, 32, 33, and 34 which electrically couple to a mating connector 66 (FIG. 5) extending from the headliner 19 bundle of conductors 67 (FIG. 5) for coupling the headliner electrical and electronic components to the connector 30. Each of the contacts 31-34 of connector 30 are coupled to conductors 41-44 respectively of conductor bundle 40 which may be a flat ribbon-like conducting element including a multiplex conductor 41, a power conductor 42, a switched power conductor 43 which is operated by the courtesy light switches, and a ground conductor 44. Conductor bundle 40 extends to a second electrical connector 49 in the form of a socket mounted to the lower end 26 of panel 21 and which mates with a mating electrical connector 64 (FIG. 5) extending from the instrument panel conductor bundle 62.

Connector 49 receives conductors 41-44 and includes additional conductors for supplying operating power to an electrical compass 50, which includes a circuit board 52 mounted to the rear surface 23 of an enlarged compass housing 28 of connecting link 20. As best seen in FIG. 1, the compass 50 includes a display 54 mounted within an aperture 27 in the housing section 28 of panel 21, and a control push-button switch 56 mounted within an aperture 29 located above display 54 for actuating the compass. As best seen in FIG. 1, mounting display 54 within aperture 27 of the housing portion 28 of trim panel connecting link 20 positions the display in a very convenient location highly visible to the driver. Display 54 is a digital display for displaying vehicle heading information to the vehicle operator as well as ambient temperature as seen in FIG. 1. In a preferred embodiment of the invention, display 54 was a vacuum fluorescent type display although other types of digital displays or indicators can be located in the panel 21.

By virtue of the fact that the trim panel connecting link 20 includes the electrical conductors coupled to the vehicle's electrical system through connector 49, the housing 28 may include electrical components such as the compass 50 or other components which either may include a display conveniently located in housing section 28 or at other locations along the A-pillar trim panel. The panel 21 may also include control switches, such as switch 56, which also is conveniently located for actuation by the vehicle operator. This heretofore unused location provides not only a convenient connection for supplying electrical power from the instrument panel area to the headliner electronics, but also simultaneously provides a convenient mounting location for vehicle electrical controls and displays.

Figure 5:
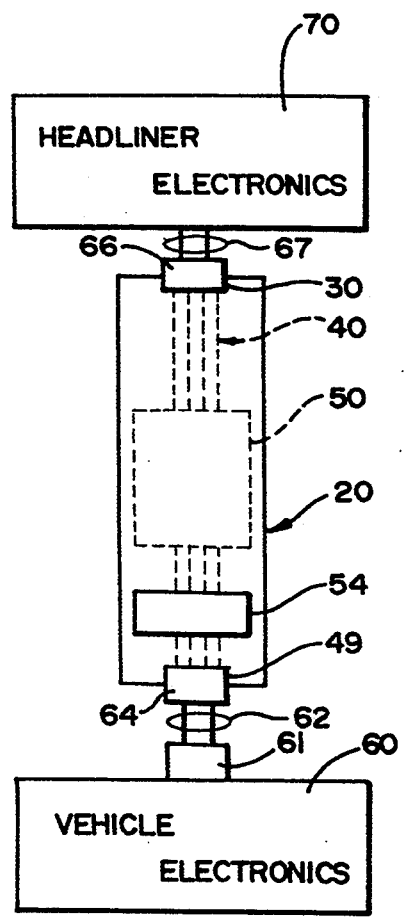
FIG. 5 is an electrical circuit diagram in block form of the electrical system showing the interconnecting link of the present invention.

The electrical circuit diagram for the system shown in FIGS. 1-4 is shown in FIG. 5 and includes a vehicle electronics circuit 60 which may include a micro-controller, a variety of vehicle sensors for engine operating parameters, including instrument panel operated control switches for actuating vehicle equipment such as lights and the like. A conductor bundle 62 comprising a plurality of conductors is coupled to the vehicle electronic circuit 60 by means of a connector 61 and to connector 49 of the trim panel connector 20 by means of a mating connector 64. The connector 30 associated with the upper end of the trim panel 21 is coupled to a mating connector 66, and conductor bundle 67 coupled to the headliner electronics and electrical circuit 70. Circuit 70 may include map lamps, a garage door opening transmitter, vehicle operating parameter warning lights or displays, or the like. Thus, the trim panel connecting link 20 provides an electrical connection between circuits 60 and 70 as well as provides a convenient location for other vehicle electronics, such as compass 50 with a display 54 readily visible to the vehicle operator. The vehicle electronics 60 and headliner electronics 70 can be of the type disclosed in the above-identified U.S. Pat. Nos. 4,241,870 and 5,154,617 incorporated herein by reference.

Thus, with the system of the present invention, a trim panel is used for providing not only an electrical connecting link which is significantly more convenient than providing an elongated electrical conductor between the instrument panel and the headliner, as well as supplying a location for additional electronics and displays. The incorporation of the connecting link and electronics into a trim panel such as the A-pillar trim panel 21 disclosed herein allows tile pre-manufacturing and assembly of the panel conductors and connectors as well as electronics mounted therein such that during assembly, the lower end of the panel can be electrically coupled using connector 49 and the upper panel connected using connector 30. The panel 21 is mechanically held in position with one or more snap-in spring clips 24 which snap within aligned rectangular apertures (not shown) within the sheet metal A-pillar 18.

The trim panel connecting link system of tile present invention can be used at any one of the A-, B-, or C-pillars of the vehicle with panels used in the B- and C-pillar area including accessories for use by the rear seat passengers including, for example, map lamps and their control switches. These and other modifications to the preferred embodiment of the invention will become apparent to those skilled in the art and fall within the spirit and scope of the invention as defined by tile appended claims.

The embodiments of the invention in which an exclusive property or privilege is claimed are defined as follows:

1. A trim panel connecting link for a vehicle comprising:
   a trim panel shaped to extend over a body support member for a vehicle and including a first end and a second end;
   conductor means extending from said first end to said second end of said panel;
   connector means mounted to opposite ends of said conductor means such that said trim panel connecting link can be employed for providing an electrical current path coupling conductors having connectors positioned adjacent the first and second ends of said trim panel when the trim panel is mounted to the vehicle body part; and
   said panel further includes aperture means and an information display component coupled within said aperture means for exposure to the interior of the vehicle, and wherein said information display component is coupled to said conductor means.

2. A trim panel connecting link for a vehicle comprising:
   a trim panel shaped to extend over a body support member for a vehicle and including a first end and a second end, wherein said panel further includes aperture means and display means coupled within said aperture means for exposure to the interior of the vehicle;
   conductor means extending from said first end to said second end of said panel; and
   connector means mounted to opposite ends of said conductor means such that said trim panel connecting link can be employed for providing an electrical current path coupling conductors having connectors positioned adjacent the first and second ends of said trim panel when the trim panel is mounted to the vehicle body part, wherein said display means is coupled to said conductor means for receiving display information therefrom.

3. The trim panel connecting link as defined in claim 2 wherein said panel is elongated and shaped to extend over one of the body pillars of a vehicle.

4. The trim panel connecting link as defined in claim 2 wherein said panel is elongated and includes an enlarged section for receiving an electrical circuit and display therein.

5. The trim panel connecting link as defined in claim 2 and further including clip means mounted to said panel for securing said panel to a body support.

6. The trim panel connecting link as defined in claim 5 wherein said panel is elongated for covering a structural pillar of a vehicle.

7. The trim panel connecting link as defined in claim 6 wherein said first and second ends of said panel are curved to conform to the vehicle body adjacent said ends.

8. The trim panel connecting link as defined in claim 7 and further including an electrical circuit mounted to said panel.

9. A trim panel connecting link for a vehicle comprising:
an elongated trim panel shaped to extend over a structural pillar body support member for a vehicle and including a first end and a second end, wherein said first and second ends of said panel are curved to conform to the vehicle body adjacent said ends;
clip means mounted to said panel for securing said panel to a body support;
conductor means extending from said first end to said second end of said panel; and
connector means mounted to opposite ends of said conductor means such that said trim panel connecting link can be employed for providing an electrical current path coupling conductors having connectors positioned adjacent the first and second ends of said trim panel when the trim panel is mounted to the vehicle body part, and an electrical circuit mounted to said panel wherein said electrical circuit includes a control switch mounted to said panel and accessible from the exterior of said panel.

10. A trim panel connecting link for a vehicle comprising:
an elongated trim panel shaped to extend over a structural pillar body support member for a vehicle and including a first end and a second end, wherein said first and second ends of said panel are curved to conform to the vehicle body adjacent said ends;
clip means mounted to said panel for securing said panel to a body support;
conductor means extending from said first end to said second end of said panel;.
connector means mounted to opposite ends of said conductor means such that said trim panel connecting link can be employed for providing an electrical current path coupling conductors having connectors positioned adjacent the first and second ends of said trim panel when the trim panel is mounted to the vehicle body part; and
an electrical circuit mounted to said panel, and further including a display coupled to said electrical circuit and mounted to said panel to face the interior of the vehicle.

11. An A-pillar display for a vehicle comprising:
a trim panel shaped to cover an A-pillar of a vehicle said panel including means for mounting display thereto;
a display mounted to said trim panel to face the interior of the vehicle; and
conductor means extending between said trim panel and the A-pillar of the vehicle for coupling said display to a source of signal information to be displayed.

12. The A-pillar display as defined in claim 11 wherein said panel includes a lower end positioned in adjacent relationship to a vehicle instrument panel when said panel is installed and wherein said display is mounted to said lower end.

13. The A-pillar display as defined in claim 12 wherein said display is a digital display.

14. The A-pillar display as defined in claim 13 wherein said display is a vacuum fluorescent display.

15. The A-pillar display as defined in claim 11 wherein said panel includes an enlarged housing and an electrical circuit mounted within said housing and coupled to said display.

16. The A-pillar display as defined in claim 11 and further including electrical conductors extending from opposite ends of said panel to couple conductors in the headliner of the vehicle to conductors in the instrument panel of the vehicle.

17. The A-pillar display as defined in claim 16 and further including connectors coupled to opposite ends of said electrical conductors and mounted to opposite ends of said panel.

18. The A-pillar display as defined in claim 17 and further including at least one mounting clip for fastening said panel to the A-pillar of a vehicle.

19. A trim panel connecting link and display for a vehicle comprising:
a trim panel shaped to extend over a body support member for a vehicle and including a first end and a second end;
conductor means extending from said first end to said second end of said panel;
means for coupling opposite ends of said conductor means to conductors extending adjacent said first and second ends of said panel such that said trim panel connecting link can be employed for providing an electrical current path between said first and second ends of said trim panel when the trim panel is mounted to the vehicle body part; and
display means mounted to said trim panel to face the interior of the vehicle, said display means coupled to said conductor means for displaying signal information carried thereby.

20. The trim panel connecting link and display as defined in claim 19 wherein said panel is elongated and shaped to cover the A-pillar of a vehicle.

21. The trim panel connecting link and display as defined in claim 20 and further including switch means coupled to said conductor means and mounted adjacent said display for controlling said display.

22. The trim panel connecting link and display as defined in claim 19 wherein said panel includes a housing and an electrical circuit mounted within said housing and coupled to said display.

23. The trim panel connecting link and display as defined in claim 22 wherein said electrical circuit is an electrical compass and wherein said display is mounted to a lower end of said panel.

24. The trim panel connecting link and display as defined in claim 19 wherein said display is mounted to the lower end of said panel.

25. The trim panel connecting link and display as defined in claim 24 wherein said panel is shaped to cover the A-pillar of a vehicle.

* * * * *

UNITED STATES PATENT AND TRADEMARK OFFICE
CERTIFICATE OF CORRECTION

PATENT NO. : 5,415,554
DATED : May 16, 1995
INVENTOR : Gordon B. Kempkers et al.

It is certified that error appears in the above-identified patent and that said Letters Patent is hereby corrected as shown below:

Column 1, line 17;
    "tile like" should be --the like--.

Column 1, line 17;
    "In tile" should be --In the--.

Column 1, line 24;
    "tile structural" should be --the structural--.

Column 1, line 25;
    "tile roof" should be --the roof--.

Column 1, line 32;
    "tile car" should be --the car--.

Column 1, line 39;
    "tile conductor" should be --the conductor--.

Column 1, line 43;
    "tile conductors" should be --the conductors--.

Column 1, line 44;
    "tile prior" should be --the prior--.

Column 1, line 51;
    "tile form" should be --the form--.

Column 1, line 56;
    "from tile" should be --from the--.

Column 2, line 10;
    "tile following" should be --the following--.

UNITED STATES PATENT AND TRADEMARK OFFICE
CERTIFICATE OF CORRECTION

PATENT NO. : 5,415,554
DATED : May 16, 1995
INVENTOR : Gordon B. Kempkers et al.

It is certified that error appears in the above-identified patent and that said Letters Patent is hereby corrected as shown below:

Column 2, line 57;
"tipper" should be --upper--.

Column 4, line 15;
"allows tile" should be --allows the--.

Column 4, line 24;
"tile present" should be --the present--.

Column 4, line 32;
"by tile" should be --by the--.

Signed and Sealed this

Thirtieth Day of April, 1996

Attest:

BRUCE LEHMAN

Attesting Officer    Commissioner of Patents and Trademarks